July 3, 1951  E. R. SIMON  2,559,232
ROTARY HOE WHEEL
Filed Oct. 20, 1947  3 Sheets-Sheet 1

INVENTOR.
EUGENE R. SIMON
BY Harry P. Canfield
ATTORNEY.

July 3, 1951   E. R. SIMON   2,559,232
ROTARY HOE WHEEL
Filed Oct. 20, 1947   3 Sheets-Sheet 2
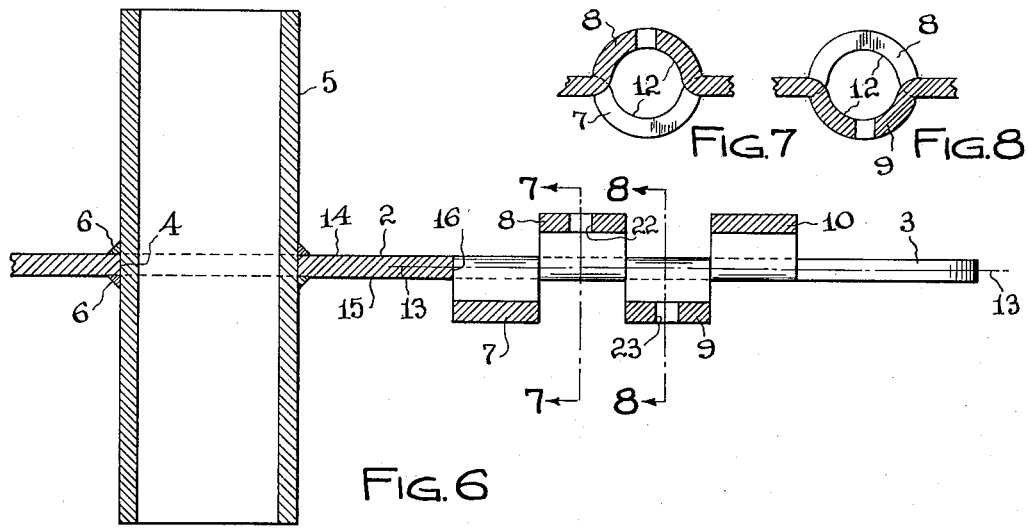
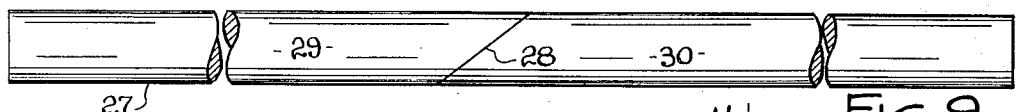
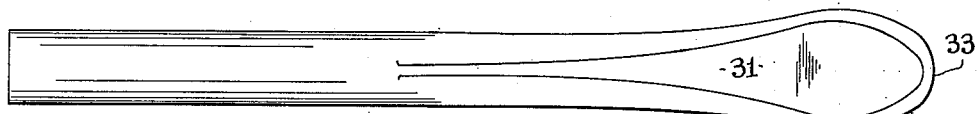
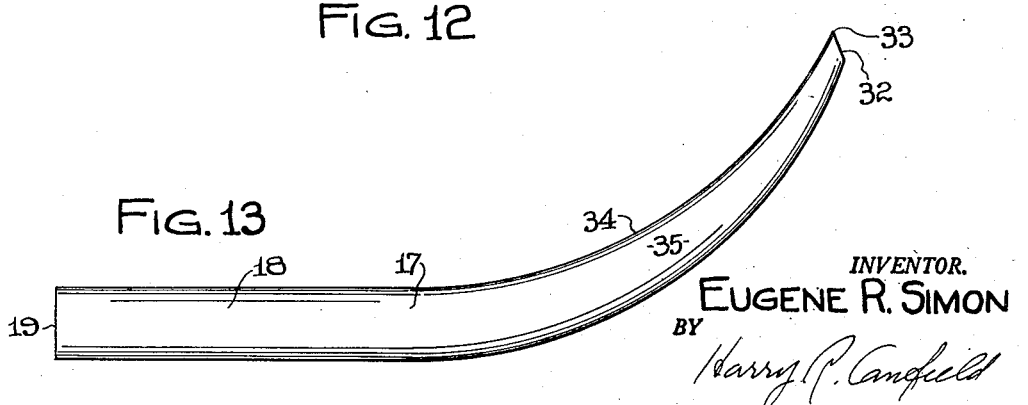
INVENTOR.
EUGENE R. SIMON
BY
Harry P. Canfield
ATTORNEY.

July 3, 1951     E. R. SIMON     2,559,232
ROTARY HOE WHEEL
Filed Oct. 20, 1947     3 Sheets-Sheet 3
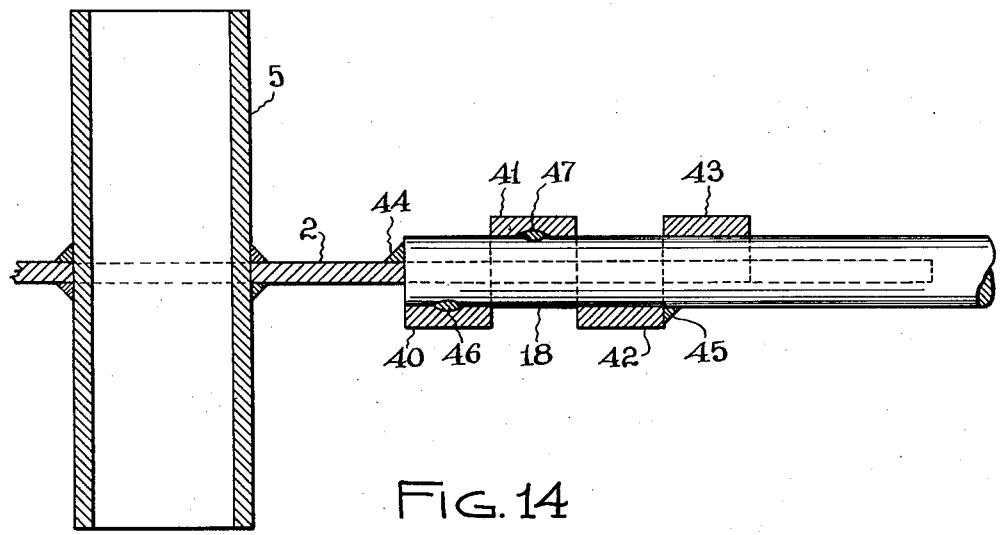
Fig. 14
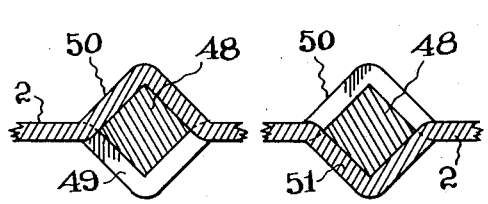 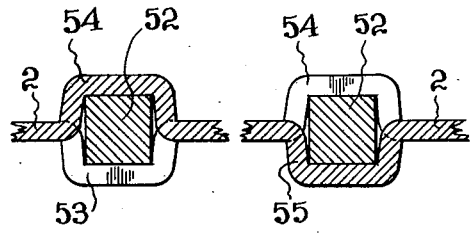
Fig. 15    Fig. 16    Fig. 17    Fig. 18
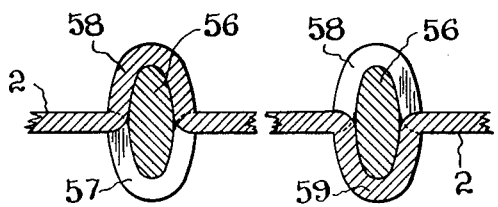 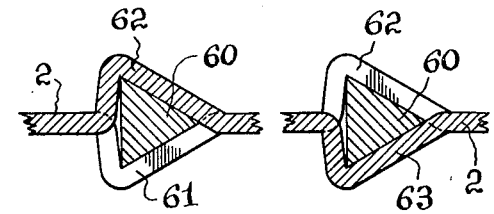
Fig. 19    Fig. 20    Fig. 21    Fig. 22
INVENTOR.
EUGENE R. SIMON
BY
*Larry P. Caufield*
ATTORNEY.

Patented July 3, 1951

2,559,232

UNITED STATES PATENT OFFICE 2,559,232

ROTARY HOE WHEEL

Eugene R. Simon, Petersburg, Ill.

Application October 20, 1947, Serial No. 780,776

8 Claims. (Cl. 97—212)

This invention relates to agricultural implements generally of the harrow class, having toothed wheels for tilling the soil, and relates particularly to the toothed wheels themselves.

Toothed wheels of this type are known comprising generally a central body having teeth radiating therefrom, and provided with a bearing for rotation on an implement frame shaft. A number of such wheels are commonly mounted side by side on the shaft in a gang, and support the implement frame; and roll along the ground when the implement frame is propelled; the teeth working the soil as the wheels roll.

Such toothed wheels have been variously made from cast metal, from steel parts, or steel and cast metal parts, etc., joined together; but the cost of the material and manufacturing operations, in making the wheels themselves, keeps the cost of the whole implement high, because many wheels are used in each gang, and there are often several gangs on the implement. A saving of a few cents of manufacturing cost per wheel therefore becomes important.

It is among the objects of this invention:

To provide a toothed wheel of this class which can be manufactured at low cost;

To provide a toothed wheel comprising a one piece sheet metal body, and teeth secured thereto in an improved manner;

To provide a toothed wheel comprising a central body formed as a one piece sheet metal stamping having loops thereon; curved steel teeth, having shanks projected through the loops to position them; and means securing the shanks from rotating on the loops and from coming out of the loops; and the body stamping formed to take up radial load thrust on the teeth and shanks independently of the securing means.

Other objects will be apparent to those skilled in the art to which the invention appertains.

The invention is fully disclosed in the following description taken in connection with the accompanying drawing, in which.

Figure 1:
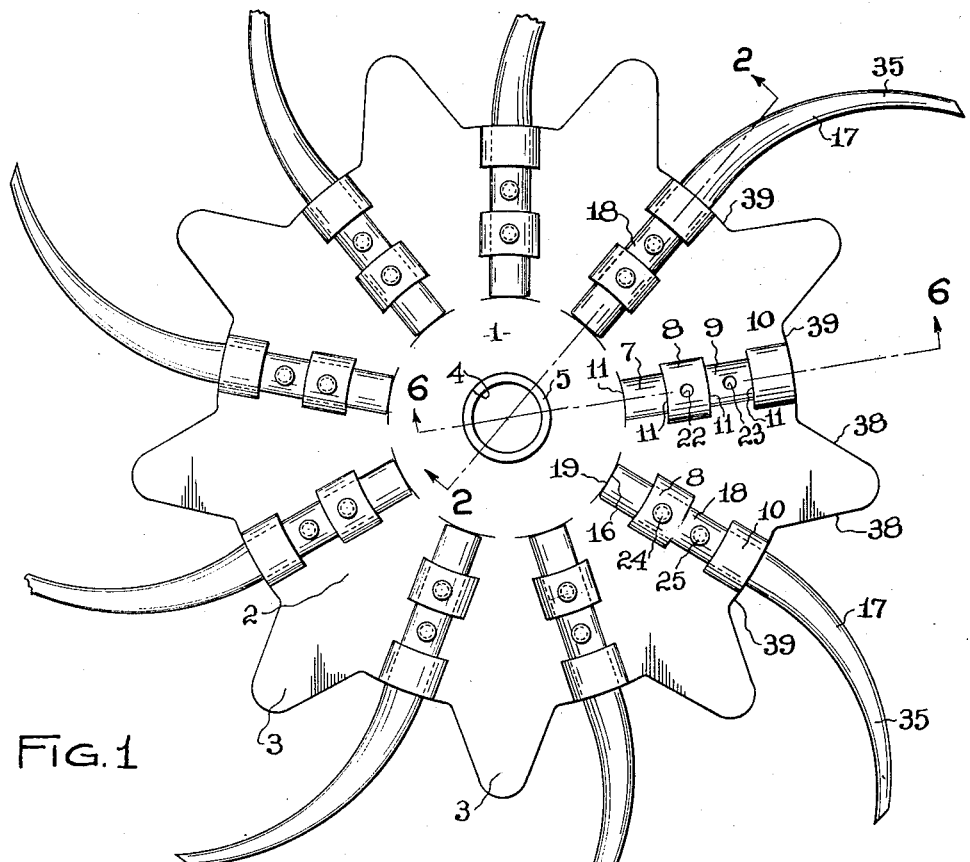
Fig. 1 is a side view of a toothed wheel embodying the invention, with one tooth omitted and other teeth broken off; approximately to one-half full scale.
Figures 3, 4, 5:
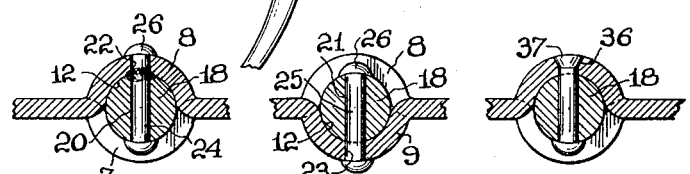
Figure 2:
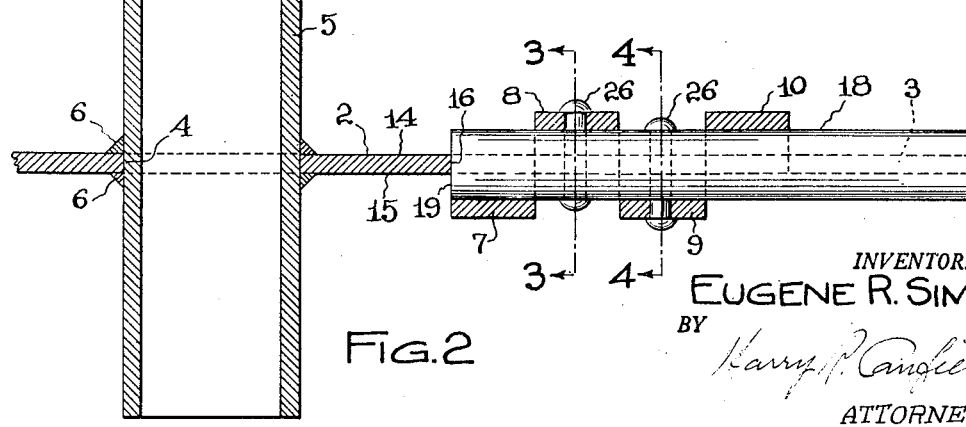
Fig. 2 is a sectional view from the plane 2—2 of Fig. 1, drawn to full scale.

Figs. 3 and 4 are sectional views from the planes 3—3 and 4—4 of Fig. 2;

Fig. 5 is a view similar to Fig. 3 showing a modification;

Fig. 6 is a sectional view from the plane 6—6 of Fig. 1 drawn to full scale;

Figs. 7 and 8 are sectional views from the planes 7—7 and 8—8 of Fig. 6;

Fig. 9 is a view full scale of two blanks from which two teeth of the foregoing figures are made;

Fig. 10 is a side view showing steps of method of making a tooth from a blank of Fig. 9;

Figs. 11 and 12 are views in the direction of the arrows 11 and 12 of Fig. 10;

Fig. 13 is a view showing a final operation on the tooth of Figs. 10, 11 and 12.

Fig. 14 is a view similar to Fig. 2 showing two different modifications;

The pairs of views: Figs. 15-16; and Figs. 17-18; and Figs. 19-20; and Figs. 21-22 are views similar to the pair of views Figs. 3 and 4, illustrating modifications.

Referring to the drawing, I have shown at 1 a flat or planar sheet metal wheel body preferably of steel, made by shear-cut and press-forming operations, preferably all at one stroke of a machine, using a suitable die; those skilled in the art knowing how to make the die.

The body 1 comprises a main central portion 2 and a circular series of preferably round-ended, tapering projections 3—3 peripherally thereof, extending radially or generally radially outwardly therefrom and to be referred to.

There is a central perforation 4 through which a tubular piece 5 preferably of steel is telescoped, and disposed (by means of an assembling jig not shown) at right angles to the plane of the body and welded thereto as at 6 to provide a rotary bearing hub for rotation of the wheel on an implement shaft in the usual manner.

Between each pair of projections 3—3 is a radial series or group of loops 7, 8, 9, and 10. These are formed by first cutting through the blank, on shear lines 11—11 and then press-forming the metal between pairs of shear-cuts to form the loops. Successive loops in each series 7, 8, 9, and 10 are on alternate sides of the body 1.

In the particular embodiment of the invention illustrated, the groups of loops are all alike, and there are four such loops in each group as shown; although in some cases more or fewer may be provided, and two alternate loops may suffice.

The alternating loops 7 to 10 of each group are pressed outwardly from opposite side faces of the body 1, that is, are staggered.

The insides of the loops are cylindrical as at 12 and each group has a generally radial common axis 13 preferably midway between the opposite faces 14 and 15 of the body 1. The loops of each group define a cylindrical hole as will be apparent.

The radially innermost shear line 11 leaves an edge 16 when the loop 7 has been formed, which extends across the radially inner end of said defined cylindrical hole.

The said projections 3—3 extend outwardly beyond the radially outermost loop 10.

A tooth 17 is mounted in each group of loops. It has a cylindrical or round-section shank 18 telescoped into the said defined cylindrical hole provided by the group of loops, substantially fitting it, until its inner end 19 abuts upon the said body edge 16. Transverse holes 20—21 drilled through the shank 18 are thereby aligned with corresponding perforations 22—23 in the loops 8 and 9, which were preferably previously formed by the press at the time the body was stamped out and before the loops were pressed out, although if preferred they can be drilled or punched in the loops after the loops are formed.

Rivets 24—25 are projected through these aligned holes and riveted over as at 26—26.

The teeth are preferably formed from round stock. A length 27 of stock is cut off, and this is cut apart in the middle by shearing in a die along a diagonal line 28, making two blanks 29—30.

Each blank is then forged hot to provide at one end portion a widened and thinned spade or shovel shaped portion 31, with a round beveled end portion 32, and the latter may be ground to provide a sharp edge 33 at the end.

The tooth is then bent as at 34 to give curvature to the outward portion, as at 35, leaving the inner portion or shank 18 straight for mounting as described. The rivet holes 20—21 in the shank are drilled in such position that when the tooth is mounted, the whole soil working portion of the tooth, including its curved portion 35, lies generally in the plane of the body. This prevents the tooth from tending to rotate on the axis of its shank 18.

In use, the rivets keep the tooth from turning in the loops, so that the soil working end is caused to penetrate the soil and work it most effectively, and this force on the rivets is small as aforesaid. The abutting engagement of the inner end 19 of the tooth shank 18 with the said edge 16, takes the thrust of the tooth as it is forced by the weight of the whole implement to penetrate the soil, so that the rivets are not thereby subjected to shearing force.

One of the objections to prior toothed-wheels having teeth riveted on a body is that the rivets are subjected to great strain and become loose and shear off.

Rivets are shown in two loops, 8 and 9. Others may be provided in the other loops or only one may in some cases be used.

In Fig. 5 as a modification, the rivet hole in the loop is counter-sunk as at 36 for peening over the rivet end, as at 37, to help draw the shank tight against the wall of the loop for greater rigidity.

The projections 3—3 as described, are thin, having only the thickness of the sheet metal of the body. They perform a clod-cutting action by their sides 38 in the nature of blades, as they rotate toward the ground. At the same time, they are tapering and blunt on the end as shown and resist penetration into the soil as they come under the rotary axis of the wheel.

Also, the body has circular peripheral edge portions 39—39 between the projections 3—3. The combined action of the projections 3—3 and edge portions 39—39 is to limit to a predetermined depth, the penetration of the teeth 17—17, the wheel in average sail tending to rotate on the circle of the peripheral portions 39—39.

The teeth outwardly of the body 1 converge toward each other; and the projections 3—3 between them prevent stones from wedging between the teeth.

It will be observed that by providing alternate loops 7 to 10 on opposite sides of the central plane of the body, the radial load thrust on the body is transmitted directly through the planar body to the hub 5 and thus there is little side thrust on the body whereby the sheet metal from which the body is formed may be relatively thin and entail small cost. In this connection, I have found that for teeth made as aforesaid from ½ inch to 7/16 inch round stock, the wheel body 1 will be strong enough to force them into the soil to full working depth with the body made from sheet steel only ⅛ to 9/64 inch thick.

In the foregoing, in connection with Figs. 1 to 13 inclusive, I have illustrated one complete embodiment of the invention. In Figs. 14 to 22 are illustrated other embodiments and modifications. A brief description of these embodiments will now suffice in view of the more complete description of the first embodiment. These embodiments may be preferable to that of Figs. 1 to 13.

In Figs. 1 to 13, the tooth shank is secured against rotation in and withdrawal from the loops 7 to 10 by rivets. As shown in Fig. 14, this may be accomplished by welding.

In Fig. 14, corresponding to Fig. 2, is indicated a series of four loops 40, 41, 42, and 43. As shown at 44, the shank 18 is welded to the body 2, and at 45 is welded to the loop 42; by arc or torch welding; and as an alternative means, as shown at 46 the shank is welded to the loop 40, and at 47 to the loop 41 by resistance welding, projection welding, or spot welding.

In either case, these welds may be applied variously and differently to the loops, and in both cases, they prevent the tooth shank 18 from rotating and from being withdrawn from the loops.

In Figs. 1 to 13, the soil-working tooth has a shank 18 of circular cross section, and the corresponding loops are correspondingly circular as shown in Figs. 3 and 4.

In Figs. 15 and 16 is shown a shank 48 of square or rectangular section, and loops 49—50 and 51—50 are provided (corresponding to the loops 7—8 and 9—8 of Figs. 3 and 4). The shank 48 is disposed with the two diagonals of the section vertical and horizontal and the shape of the loops corresponds to the sectional shape of the shank, and are therefore each of V-shape.

In Figs. 17 and 18, the shank 52 is of square or rectangular section, but disposed with the opposite plane faces thereof respectively at right angles and parallel to the plane of the body 2. The loops 53—54 and 55—54 (corresponding to the loops 7—8 and 9—8 of Figs. 3 and 4) are U-shaped to correspond to the shape of the shank section.

In Figs. 19 and 20, the shank 56 is of oval section and the loops 57—58 and 59—58 (corresponding to the loops 7—8 and 9—8 of Figs. 3 and 4) conform to the shape of the section.

In Figs. 21 and 22, the shank 60 is of triangular section, with an apex of the triangle in the plane of the body 2, and the opposite base at right angles thereto. The loops 61—62 and 63—62 (corresponding to the loops 7—8 and 9—8 of Figs. 3 and 4) conform to the shape of the triangular section.

To secure the shanks 48, 52, 56, and 60 in their loops, rivets as in the form of Figs. 1 to 13 could be employed as will be understood; but here it is preferred to weld the shank to a loop or loops, or to the body 2, as described for Fig. 14.

The shank not being of circular section in these forms is, by its shape, interlocked with the loop or loops to prevent rotation of the shank; and welding at only one point may therefore suffice, since all the weld has to do is to prevent withdrawal of the shank out of the loops. Load thrust as in the form of Figs. 1 to 13 may be taken up by engagement of the inner end of the shank with the shoulder 16 on the body as in Figs. 1 to 13.

Soil working portions may be forged on teeth made from stock of the sectional shapes of the shanks 48, 52, 56, and 60 substantially the same as in the form of Figs. 1 to 13 and by substantially the same process, if desired.

I claim:

1. A rotary, agricultural, soil-working, toothed-wheel comprising a one-piece, generally circular, sheet-metal, press-formed body, having a central perforation, and having a circular series of peripheral, circumferentially-spaced, radially outwardly extending, tapering projections; the body and the projections lying substantially in the same plane; the body between each pair of projections, having substantially circular peripheral edge portions; a radial series of press-formed, axially aligned, open, loops between each pair of projections extending alternately in opposite directions from the opposite faces of the body, and having a common group axis in the plane of the body; the body, radially inwardly of the radially innermost loop, having an edge in the plane of the body transverse to the axis of the loops; a circular series of teeth, each tooth having a straight shank projected through one of the series of loops, and abutting at its radially inner end upon said edge; means securing the shank against rotation in and withdrawal from the series of loops; and a tubular hub projected through the central perforation, and welded to the body.

2. A rotary, agricultural, soil-working, toothed-wheel, comprising a one-piece, generally circular, press-formed, sheet-metal body having a central perforation and a circular series of peripheral, outwardly extending projections; the body, between each pair of projections, having a group of open loops press-formed from the body, different loops of the group extending oppositely from the opposite faces of the body, and having a generally radial common group axis; an abutment on the body adjacent to the radially inward side of the radially innermost loop; a plurality of teeth each having a shank projected through a group of loops and at its inner end abutting upon the said abutment; means securing the shank against rotation in and withdrawal from the group of loops; the tooth having a soil working portion projecting outwardly farther than the said projections; and a hub secured to the body and having a rotary bearing bore axially aligned with the central body perforation.

3. In a rotary, agricultural, soil-working, toothed-wheel, a main base comprising a one-piece, press-formed, generally circular, sheet metal, planar body portion, provided with a circular series of groups of loops, different ones of the loops of each group extending oppositely from the opposite faces of the body portion, and each group having a common group axis in a generally radial direction; and the body portion provided with an abutment adjacent to the radially inner side of the radially innermost loop of each group; and the body portion provided with a central perforation sized to telescope over a wheel supported implement shaft.

4. In a rotary, agricultural, soil-working, toothed-wheel, a main base comprising a one-piece, press-formed, generally circular, sheet metal, planar body portion, provided with a circular series of groups of loops, different ones of the loops of each group extending oppositely from the opposite faces of the body portion, and each group having a common group axis in a generally radial direction; and the body portion provided with an abutment adjacent to the radially inner side of the radially innermost loop of each group; and the body portion provided with a central perforation sized to telescope over a wheel supported implement shaft; and a circular series of peripheral projections substantially in the plane of the body extending outwardly, generally radially, beyond the groups of loops, the projections being outwardly tapering.

5. In a rotary, agricultural, soil-working, toothed-wheel; a wheel body and a circular series of soil working teeth extending generally radially therefrom; the body being in the form of a flat disc of sheet metal and having a group of open aligned loops corresponding to each tooth, different ones of the group extending from opposite faces of the disc, the loops characterized as having been press-formed from the material of the disc; the tooth having a shank telescoped through the aligned loops; an abutment on the disc upon which the inner end of the tooth shank abuts; and means securing the shank against rotation in and withdrawal out of the aligned loops.

6. In a rotary, agricultural, soil-working, toothed-wheel; a wheel body and a circular series of soil working teeth extending generally radially therefrom; the body being in the form of a flat disc of sheet metal, and having a group of open aligned loops corresponding to each tooth, different ones of the group extending from opposite faces of the disc, the loops characterized as having been press-formed from the material of the disc; the tooth having a shank telescoped through the aligned loops; an abutment on the disc upon which the inner end of the tooth shank abuts; the shank being riveted to at least one loop to prevent rotation of the shank in and withdrawal out of the aligned loops.

7. In a rotary, agricultural, soil-working, toothed-wheel; a wheel body and a circular series of soil working teeth extending generally radially therefrom; the body being in the form of a flat disc of sheet metal and having a group of open aligned loops corresponding to each tooth, different ones of the group extending from opposite faces of the disc, the loops characterized as having been press-formed from the material of the disc; the tooth having a shank telescoped through the aligned loops; an abutment on the disc upon which the inner end of the tooth shank abuts; the shank being welded to the material of the disc to secure it against rotation in and withdrawal out of the aligned loops.

8. In a rotary, agricultural, self-working, toothed-wheel; a wheel body and a circular series of soil working teeth extending generally radially therefrom; the body being in the form of a flat disc of sheet metal and having a group of open aligned loops corresponding to each tooth, different ones of the group extending from opposite faces of the disc, the loops characterized as having been press-formed from the material of the disc; the tooth having a shank telescoped through the aligned loops; an abutment on the disc upon which the inner end of the tooth shank abuts; and the cross sectional shape of the shank interlocking with the shape of a loop to prevent rotation of the shank in the aligned loops and the shank being welded to the material of the disc to secure it against withdrawal out of the aligned loops.

EUGENE R. SIMON.

REFERENCES CITED

The following references are of record in the file of this patent:

UNITED STATES PATENTS

| Number | Name | Date |
|---|---|---|
| 273,021 | Burr | Feb. 27, 1883 |
| 807,395 | Newby | Dec. 12, 1905 |
| 2,116,852 | Stanford et al. | May 10, 1938 |
| 2,182,320 | Pearson | Dec. 5, 1939 |
| 2,388,553 | Kraus | Nov. 6, 1945 |
| 2,406,500 | Karl | Aug. 27, 1946 |

FOREIGN PATENTS

| Number | Country | Date |
|---|---|---|
| 242,550 | Great Britain | Nov. 12, 1925 |